June 3, 1952  O. F. TALLMAN ET AL  2,598,728
ELECTRICAL WIRE ATTACHING DEVICE

Filed Aug. 3, 1949  2 SHEETS—SHEET 1

INVENTORS
OSCAR F. TALLMAN
ROY G GRAHAM
BY *E. m. Harrington,*
ATTORNEY

June 3, 1952     O. F. TALLMAN ET AL     2,598,728
ELECTRICAL WIRE ATTACHING DEVICE Filed Aug. 3, 1949     2 SHEETS—SHEET 2

INVENTORS
OSCAR F. TALLMAN
ROY G. GRAHAM
BY *Em Harrington*,
ATTORNEY

Patented June 3, 1952

2,598,728

UNITED STATES PATENT OFFICE 2,598,728

ELECTRICAL WIRE ATTACHING DEVICE

Oscar F. Tallman and Roy G. Graham, St. Louis, Mo., assignors to James R. Kearney Corporation, St. Louis, Mo., a corporation of Missouri Application August 3, 1949, Serial No. 108,298

5 Claims. (Cl. 24—123)

This invention relates generally to electrical wire attaching devices of the type employed for mechanically attaching telephone and other wires to houses, buildings, and other structures, the predominant object of the invention being to provide attaching devices for drop or service wires which because of the improved construction and arrangement thereof may be produced at a substantial saving of material and labor, and which, in spite of their relatively inexpensive construction, are capable of performing their intended function in a highly efficient manner. The attaching devices of the present invention employ the well-known snubbing principle in providing for secure engagement of a wire with the attaching device, and because of this fact the insulation of wires engaged with the attaching devices is not impaired by pressure applied thereto as was true in the case of the rigidly-positioned, tie-in devices commonly employed heretofore. Also, the devices of the present invention are attached to buildings or other structures in a non-rigid manner so that the attaching devices may move with the whip and vibration of the wires attached to such structures with the aid of the attaching devices. As a result of this arrangement there is no centering of vibration of the wires at fixed points thereof with a resultant impairment or destruction of the insulating coverings of the wires at such points of centered vibration, as was true of the rigidly-positioned, tie-in devices mentioned above.

Figure 1:
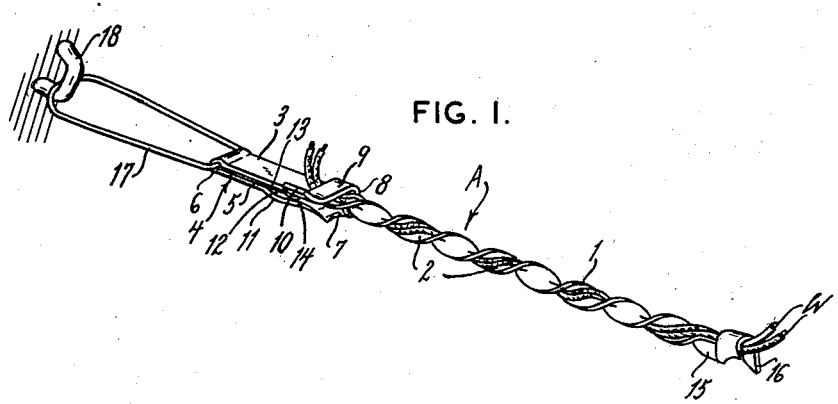
Fig. 1 is a perspective view of one form of the improved wire attaching device of the present invention.

In the drawings, wherein are shown for purposes of illustration, merely, three embodiments of the invention A designates generally the wire attaching device illustrated by Figs. 1, 2, 3, 4 and 5. The wire attaching device A is formed from a single length of strip material, said strip of material being twisted to provide an elongated body portion 1 which is provided with a continuous channelway 2 that extends spirally of said body portion 1 in the longitudinal direction of said body portion.

At one end thereof the spirally twisted body portion 1 of the wire attaching device A merges into a flat portion 3 which extends in the longitudinal direction of said body portion. The end extension 4 of the wire attaching device A of which the flat portion 3 forms a part is doubled over to provide a portion 5 which is disposed substantially parallel with respect to the portion 3, there being an eye 6 formed at the point where the portion 3 merges into the portion 5. The material of the portion 5 is twisted at the inner end thereof to provide a portion 7 which extends laterally from the portion 5, a portion 8 located beyond corresponding side edges of the portions 3 and 5, and a portion 9 which overlies the portion 3 and that is provided with an upwardly and outwardly inclined part 10. The portion 5 of the end extension 4 of the wire attaching device A is depressed slightly throughout its inner end portion, as indicated at 11 in Figs. 1 and 3 and this depression provides a space 12 between parts of the portions 3 and 5. Arranged between the portions 3 and 5 is a leaf spring 13 having an end portion which is gripped between the closely positioned parts of said portions 3 and 5, and a portion which is disposed within the space 12, the latter portion of said leaf spring being provided with a bowed portion 14 which contacts with the portion 5 of the end extension 4. The bowed portion of the leaf spring 13 tends to move the portion 5 away from the portion 3, and as a result said bowed portion of said leaf spring tends to move the portion 9 of the laterally extended part of the portion 5 toward the portion 3 of the end extension 4 for a purpose to be hereinafter explained.

Figure 2:
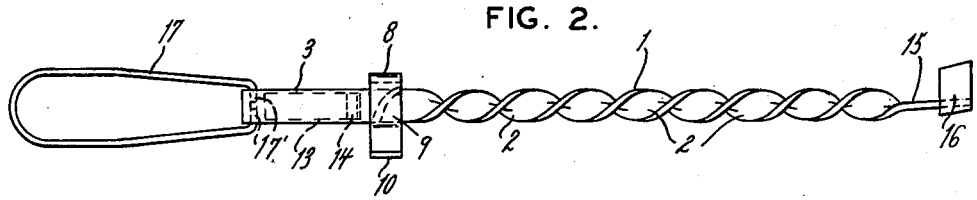
Fig. 2 is a plan view of the wire attaching device illustrated by Fig. 1.
Figure 3:
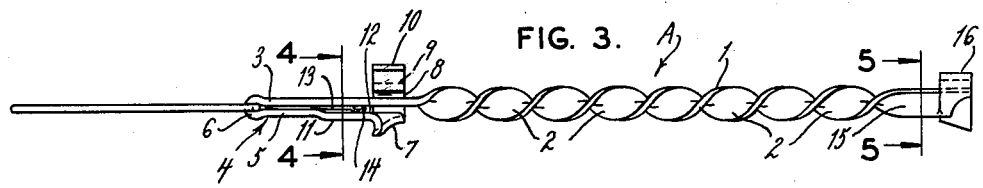
Fig. 3 is a side elevational view of the wire attaching device shown in Figs. 1 and 2.
Figure 4:
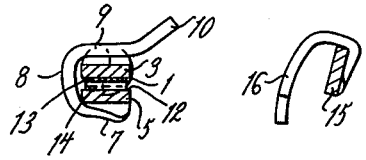
Fig. 4 is an enlarged cross-section taken on line 4—4 of Fig. 3.
Figure 5:
Fig. 5 is an enlarged cross-section taken on line 5—5 of Fig. 3.
Figure 6:
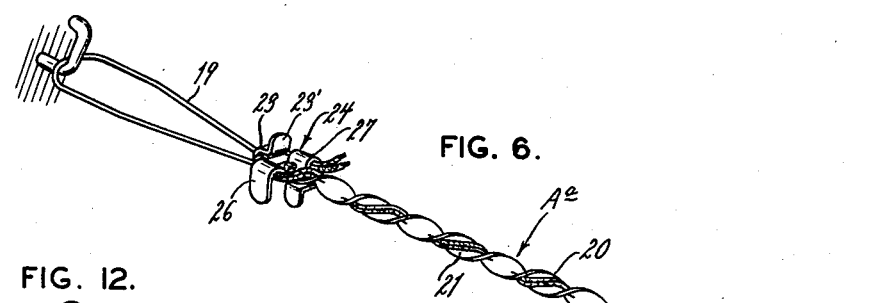
Fig. 6 is a perspective view of another form of the improved wire attaching device of the present invention.

At the end of the body portion 1 of the wire attaching device A opposite to the end at which the end extension 4 is located, said body portion 1 merges into a straight portion 15. The material of this straight portion 15 is twisted to provide a lateral extension 16 which is shaped, as is shown in Fig. 5, in the approximate form of a hook, and this lateral, hook-like extension performs a function to be hereinafter explained. Also, the wire attaching device A is provided with a bail 17 which preferably is shaped as shown in Figs. 1 and 2, said bail having inwardly projected extensions 17' which are projected into the eye 6 at opposite ends thereof. The bail serves to attach the wire attaching device A to a house or other structure, there being a suitable hook 18 projected from the house or other structure which is engaged by the bail 17, as is shown in Fig. 1.

In the use of the improved attaching device A, wires W to be attached to a house, building, or other structure are applied to the attaching device, said wires being extended through the continuous channelway 2 of the body portion 1, as is shown in Fig. 1. Portions of the wires W are forced beneath the portion 9 of the end extension 4 so that said wire portions are gripped between said portion 9 and the portion 3 through the action of the leaf spring 13 which forces the portion 9 toward the portion 3, as has been previously explained herein, portions of the wires W at the opposite end of the attaching device A being engaged by the hook-like portion 16, as is shown in Fig. 1. With the wires W applied to the attaching device A as described above, the bail 17 of the attaching device is engaged with the hook 18 extended from the house, or building to which the wires are being attached and portions of the wires are extended downwardly from the point where they are gripped by the portion 9 to the point where said wire portions enter the house or building.

Drop wires engaged by the attaching device A are held immovable with respect to the attaching device in accordance with the snubbing principle and this holding action is obtained entirely without application of clamping pressure which, as has already been pointed out herein, tends to shorten the life of wires by destroying the insulation thereof. Also, because the attaching device is engaged by the hook 18 for movement with respect thereto, there is no centering of wear at a tie-in point of the wire due to whip and vibration of the wires, as is true in the use of rigid tie-in devices, and therefore the life of the wires is greatly prolonged as the wires are not held by the attaching device to the tensile strength of the insulation, but to the breaking strength of the wires. Additionally, because of the presence of the portion 9 at one end of the body portion 1 of the attaching device and the portion 16 at the opposite end of said body portion, the wires W are prevented from becoming accidentally disengaged from said body portion 1 of the attaching device A.

Figure 10:
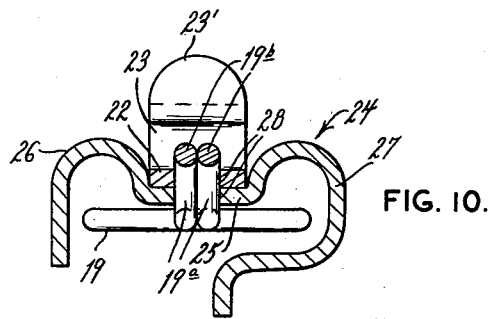
Fig. 10 is an enlarged cross-section taken on line 10—10 of Fig. 8.

The form of the invention shown in Figs. 6, 7, 8, 9, and 10 differs from the form of the invention shown in Figs. 1, 2, 3, 4, and 5, particularly in the means for holding the wires Wa at the end of the attaching device Aa at which the bail 19 is located. The attaching device Aa includes a body portion 20 in the form of a twisted strip of material having a continuous spiral channelway 21, there being an end extension 22 at one end of said body portion which is substantially flat and which terminates in a hook-shaped portion 23 having an outwardly extended lip 23'. Extended laterally of the end extension 22 is an element 24 which is formed from a strip of material and is shaped as is shown to good advantage in Figs. 9 and 10; that is to say, the element 24 includes a portion 25 which is disposed in contact with a face of the end extension 22, a portion 26 at one side of the portion 25 which is shaped as shown in Fig. 10, and a portion 27 at the opposite side of said portion 25 which is shaped as is shown in Fig. 10. The element 24 is secured to the end extension 22 by portions of the bail 19 which extend through registering apertures 28 that are formed through the end extension 22 and through the portion 25 of the element 24 (Figs. 9 and 10), the end portions of the bail being provided with angular portions 19a which extend through the apertures 28, and offset portions 19b which serve to retain the bail portions 19a in the apertures 28.

In the use of the form of the invention shown in Figs. 6, 7, 8, 9, and 10, the portions of the wires Wa which extend from the spiral channelway of the body portion 20 to provide drop wires are first introduced into the portion 26 of the element 24, portions of said wires then being drawn to a position where they are disposed within the hook-shaped portion 23 of the end extension 22, and portions of said wires being then drawn into the portion 27 of the element 24 from which said wires extend downwardly to the point where they enter the house or building to which they are attached by the wire attaching device Aa. The attaching device Aa is provided with a curved continuation 29 at the end thereof opposite to the end at which the bail 19 is located which engages the wires Wa and prevents their disengagement from the body portion 20 of said attaching device.

Figure 12:
Fig. 12 is an end elevational view of the wire attaching device of Fig. 11.
Figure 11:
Fig. 11 is a side elevational view of still another form of the improved wire attaching device of the present invention.
Figure 7:
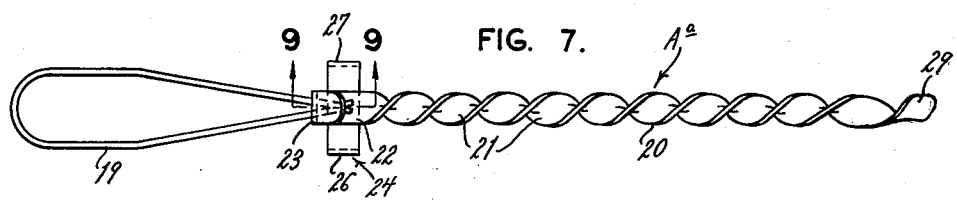
Fig. 7 is a plan view of the wire attaching device illustrated by Fig. 6.
Figure 8:
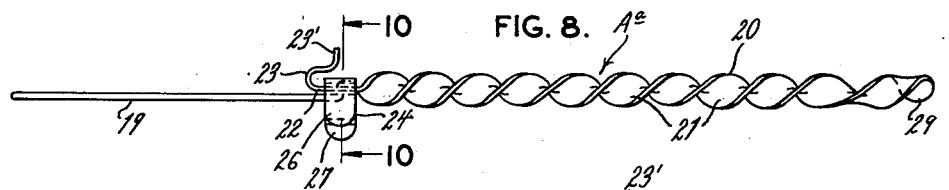
Fig. 8 is a side elevational view of the wire attaching device shown in Figs. 6 and 7.
Figure 9:
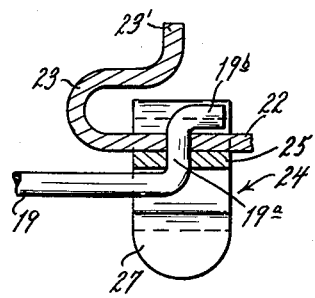
Fig. 9 is an enlarged cross-section taken on line 9—9 of Fig. 7.

Figs. 11 and 12 illustrate a form of the invention which comprises a body portion 30 having a spirally extended, continuous channelway 31. At one end thereof the attaching device of Figs. 11 and 12 is provided with an end extension 32 that is provided with apertures 33 which are adapted to receive portions of a bail (not shown), and also said end extension is provided with a hook-shaped portion 34 projected therefrom which is adapted to engage and retain wires which extend through the spiral channelway 31 of the body portion 30 of the attaching device. At the end of the attaching device remote from end thereof at which the end extension 32 is located the spirally channeled part of the body portion 30 merges into a spirally extended, tubular portion 35 through which wires engaged by the attaching device extend so as to retain said wires against accidental disengagement from said body portion of the attaching device.

We claim:

1. A wire attaching device comprising a body portion which is provided with a spiral passageway extended longitudinally thereof, an extension at an end of said body portion, said extension comprising a main portion extended from said body portion, a portion which underlies said main portion and is movable with respect thereto, a portion extended from said movable portion which extends around and overlies said main portion, and means which tends to move said movable portion relative to said main portion in such manner as to clamp a wire between said main portion and said overlying portion, a bail attached to said extension, and means at the opposite end of said body portion for retaining a wire in place at that point relative to said body portion.

2. A wire attaching device comprising a body portion which is provided with a spiral passageway extended longitudinally thereof, an extension at an end of said body portion, said extension comprising a main portion extended from said body portion, a portion which underlies said main portion and is movable with respect thereto, a portion extended from said movable portion which extends around and overlies said main portion, and spring means which tends to move said movable portion relative to said main portion in such manner as to clamp a wire between said main portion and said overlying portion, a bail attached to said extension, and means at the opposite end of said body portion for retaining a wire in place at that point relative to said body portion.

3. A wire attaching device comprising a body portion which is provided with a spiral passageway extended longitudinally thereof, an extension at an end of said body portion, said extension comprising a main portion extended from said body portion, a portion which underlies said main portion and is movable with respect thereto, a portion extended from said movable portion which extends around and overlies said main portion, and means comprising a leaf spring which tends to move said movable portion relative to said main portion in such manner as to clamp a wire between said main portion and said overlying portion, a bail attached to said extension, and means at the opposite end of said body portion for retaining a wire in place at that point relative to said body portion.

4. A wire attaching device comprising a body portion which is provided with a spiral passageway extended longitudinally thereof, an extension at an end of said body portion, said extension comprising a main portion extended from said body portion, a portion which underlies said main portion and is movable with respect thereto, a portion extended from said movable portion which extends around and overlies said main portion, and means comprising a leaf spring disposed between said main portion and said movable portion which tends to move said movable portion relative to said main portion in such manner as to clamp a wire between said main portion and said overlying portion, a bail attached to said extension, and means at the opposite end of said body portion for retaining a wire in place at that point relative to said body portion.

5. A wire attaching device comprising a body portion which is provided with a spiral passageway extended longitudinally thereof, an extension at an end of said body portion, said extension comprising a main portion extended from said body portion, a portion which underlies said main portion and is movable with respect thereto, a portion extended from said movable portion which extends around and overlies said main portion, and means which tends to move said movable portion relative to said main portion in such manner as to clamp a wire between said main portion and said overlying portion, a bail attached to said extension, an eye formed in said extension which receives portions of said bail, and means at the opposite end of said body portion for retaining a wire in place at that point relative to said body portion.

OSCAR F. TALLMAN.
ROY G. GRAHAM.

REFERENCES CITED

The following references are of record in the file of this patent:

UNITED STATES PATENTS

| Number | Name | Date |
| --- | --- | --- |
| 289,050 | Wilcox | Nov. 27, 1883 |
| 1,449,765 | McLaughlin | Mar. 27, 1923 |
| 1,578,252 | Austin | Mar. 30, 1926 |
| 1,670,333 | Aldrich | May 22, 1928 |
| 2,239,258 | Tallman | Apr. 22, 1941 |
| 2,315,826 | Tallman | Apr. 6, 1943 |
| 2,468,035 | Carroll | Apr. 26, 1949 |